J. CASE.
Seed-Planter.
No. 623 Reissued Nov. 16, 1858.
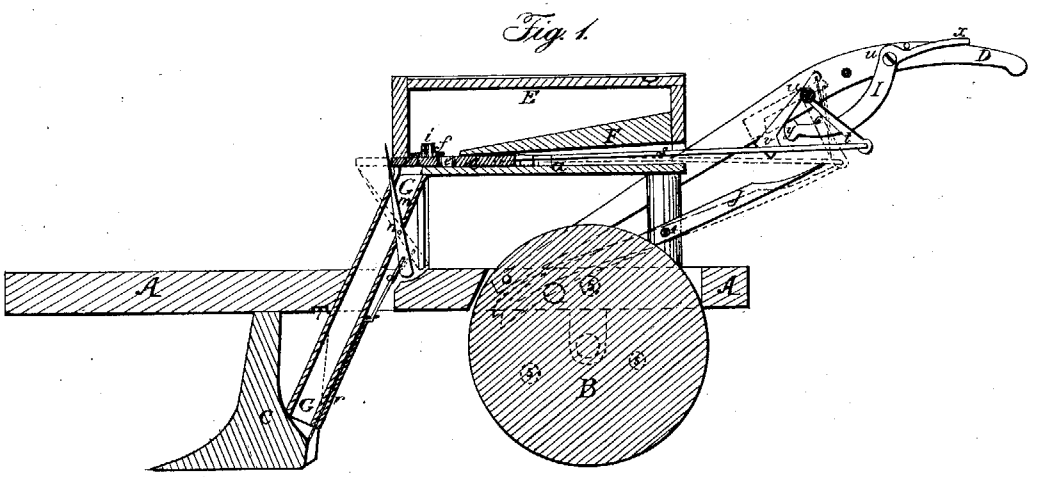
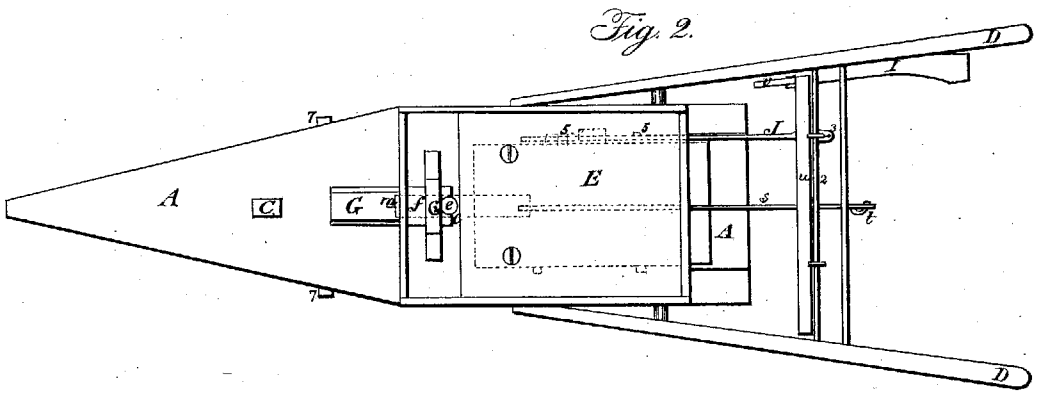
Witnesses:
H B Slaughton
Thos H. Upperman
Inventor:
Jarvis Case
AM. PHOTO-LITHO. CO. N.Y. (OSBORNE'S PROCESS)

UNITED STATES PATENT OFFICE.

JARVIS CASE, OF BLOOMINGTON, ILLINOIS.

IMPROVEMENT IN SEED-PLANTERS.

Specification forming part of Letters Patent No. 12,231, dated January 16, 1855; Reissue No. 623, dated November 16, 1858.

*To all whom it may concern:*

Be it known that I, JARVIS CASE, formerly of Springfield, in the State of Ohio, but now residing at Bloomington, in the county of McLean and State of Illinois, have invented certain new and useful Improvements in Machines for Planting Corn; and I do hereby declare the following to be a full, clear, and exact description of the construction and operation of the same, reference being had to the accompanying drawings, making a part of this specification, in which—

Figure 1 represents a central longitudinal section through the machine, and Fig. 2 represents a top plan.

Similar letters of reference, where they occur in the separate figures, denote like parts of the machine in both.

I am aware that attempts have been made to drop corn by the turning of the wheels that carry or help to sustain the machine. This I deem an impracticable mode, because of the uneven, rough character of the ground over which the machine must travel, and it is found impossible to plant corn in check-rows where the dropping depends upon the action of the machine itself. To any such machines as depend upon themselves for the dropping of the grains I lay no claim whatever, as my invention makes it imperative upon the operator to work the seed-slides, and whenever or wherever this dropping by the rotation of the wheels, or by any power derived from their rotation, is pursued, I should lay no claim to it as my invention. It is also well known that unless some compensation for the forward motion of the machine be provided for there will be irregular dropping of the grains, because during the time that the grains are dropping from the hopper to the ground the machine will have advanced some distance, and the corn will not, of course, drop immediately from the place where it starts to the ground, but be dribbled along, and thus entirely break up the check-rows, which are so important in the after cultivation of the corn. Finding these two evils to exist in all corn-planting machines which are drawn along over the ground when planting, I, after much time and expense, succeeded in avoiding them, and I do it by, first, operating the seed-slides through the attendant or rider on the machine, or walking after it, and not by the motion or rotation of the wheel or wheels; and, secondly, in connection with such operation of the seed-slides, the double dropping—that is to say, the placing of one seed-slide near the hopper and the other near the ground—so that the seed or grains shall drop first onto or into one slide, and from thence to the lower one, where it remains until opened by the operator, and from this lower slide to the furrow, the distance here being so slight the grains will fall with great accuracy in the exact spot desired.

Hand corn-planters—that is, planters carried in the hands of the operator—have been made with two valves; but in these there is no forward motion at the time of dropping, as the operator, when he drops the grains, stops. The difficulty that arises in machines that are continually advanced or drawn over the ground is not therefore incident to such machines as are carried by the operator, there being no forward motion at the time of dropping.

It is a condition of my machine that the ground to be planted should be furrowed out one way. When this is done the machine itself makes the other marks that together form the check-rows, and the great value in planting in check-rows arises from the facility with which they are cross-plowed when cultivating the corn.

The nature of my invention consists in planting corn in check-rows, or ground previously furrowed in one direction, by a machine having a continuous progressive motion over the ground in contradistinction from an intermittent motion, as in hand-machines, by means of two valves, which are worked at the proper time by the operator or attendant, so as to insure correct dropping, and to compensate for the forward motion of the machine.

To enable those skilled in the art to make and use my invention, I will proceed to describe the same with reference to the drawings.

A represents a stock or frame supported toward its rear by a wheel, B. The forward portion of the frame carries a plow, C, for opening out the furrows into which the corn is to be dropped.

D D are handles attached to the frame, by which the operator may guide and control the machine.

E is a seed box or hopper, with its bottom F inclined, so as to throw the seed forward to the exit. Underneath this bottom F there is a second bottom, *a*, with a space between them sufficient for the seed-slide *c* to move in, and which seed-slide is furnished with suitable holes, *e*, for receiving a proper charge of grain and carrying it to the seed-tube G, through which it drops by what I term "double droppings," as will be hereafter described.

*f* is a cut-off plate made of leather or some other suitably elastic material, so as not to break the grains that may protrude from the cells *e* in the seed-slide, or allow them to jam and choke up the machine.

*i* is a brush for sweeping back any excess of grain over the regular charge that may lie on the slide or its seed-cells.

*m* is a lever pivoted at *n*, the long arm of said lever projecting up far enough to be struck by the seed-slide *c* when it is run forward by the operator. The short arm of this lever *m* is connected by a cord or rod, *o*, to a slide, *r*, that works over an opening in the lower end of the seed-tube G. To the seed-slide *c* is connected one end of a rod, *s*, the other end thereof being attached to a bell-crank lever, *t*, that is fastened to a rock-shaft, *u*, and to which a drop-weight, *v*, may be also attached, to aid in restoring the rock-shaft after the operator has turned it by hand.

I is a hand-lever pivoted to the handle D at *w*, and one arm, *x*, thereof lying close to said handle, so that the operator may grasp and work it with facility. The other arm, *y*, of said lever is in contact with the poise *v*, so that by pressing down the arm *x* the shaft *u* shall be rocked and the seed-slide moved forward, as shown by the red lines. An elastic wire, 2, is placed near to and parallel with the rock-shaft *u*, against which a projection, 3, on said shaft comes when the seed-slide is shot forward, and the recoil of this wire returns or aids to return said slide for the next operation.

My machine is mainly designed for planting in check-rows; but for those who desire to drill in the grain I have added a lever, J, pivoted at 4, and its lower end projecting downward, so as to be struck by the series of studs or pins 5 in the wheel B, and thus vibrated. The upper end of this lever is connected to the projection 3 on the rock-shaft by a link, 6, and by this arrangement the seed-slide may be operated from the wheel B and without the assistance of the operator; but this arrangement cannot drop for check-rows; it can only drill in the grain. When either of these plans are pursued the other one is disconnected by simply loosening the cord or link.

The operation of check-row planting, which I most especially claim, is carried out as follows: The ground having been previously laid off in one direction, the operator, with the lever I in his hand, watches until the indicator 7 is immediately over the furrow, which is the point where the grains are to be dropped. He then throws down said lever I, which effects two operations, viz: it carries the charge of grain out of the seed-box and drops it into the tube G, and it raises the slide *r* to let out the previously-dropped charge. Thus the same operation that plants one charge puts the next succeeding charge in close proximity to the ground, so that it has but a few inches to fall when the slide *r* is opened. By this means and by using the lever I by hand I can plant in check-rows perfectly—a thing which I believe was never done previous to my doing it, and which I allege cannot be done in any other way than to cause the operator or attendant to work the seed-slides at the proper times—meaning that no slide or slides worked by the machine itself can by any possibility effect it in a sufficiently perfect manner.

Having thus fully described the nature and object of my invention, what I claim therein as new, and desire to secure by Letters Patent, is—

In combination with a corn-planting machine that is constantly moved over the ground and drops the grain intermittently, the so combining of two slides—one of which is at or near the seed-hopper and the other at or near the ground—or their equivalents, with a lever as that the operator or attendant on the machine can open said slides at the proper time to deposit the seed and prepare a new charge by the double dropping herein specified.

JARVIS CASE.

Witnesses:
A. B. STOUGHTON,
THOS. H. UPPERMAN.